United States Patent Office 2,924,391
Patented Feb. 9, 1960

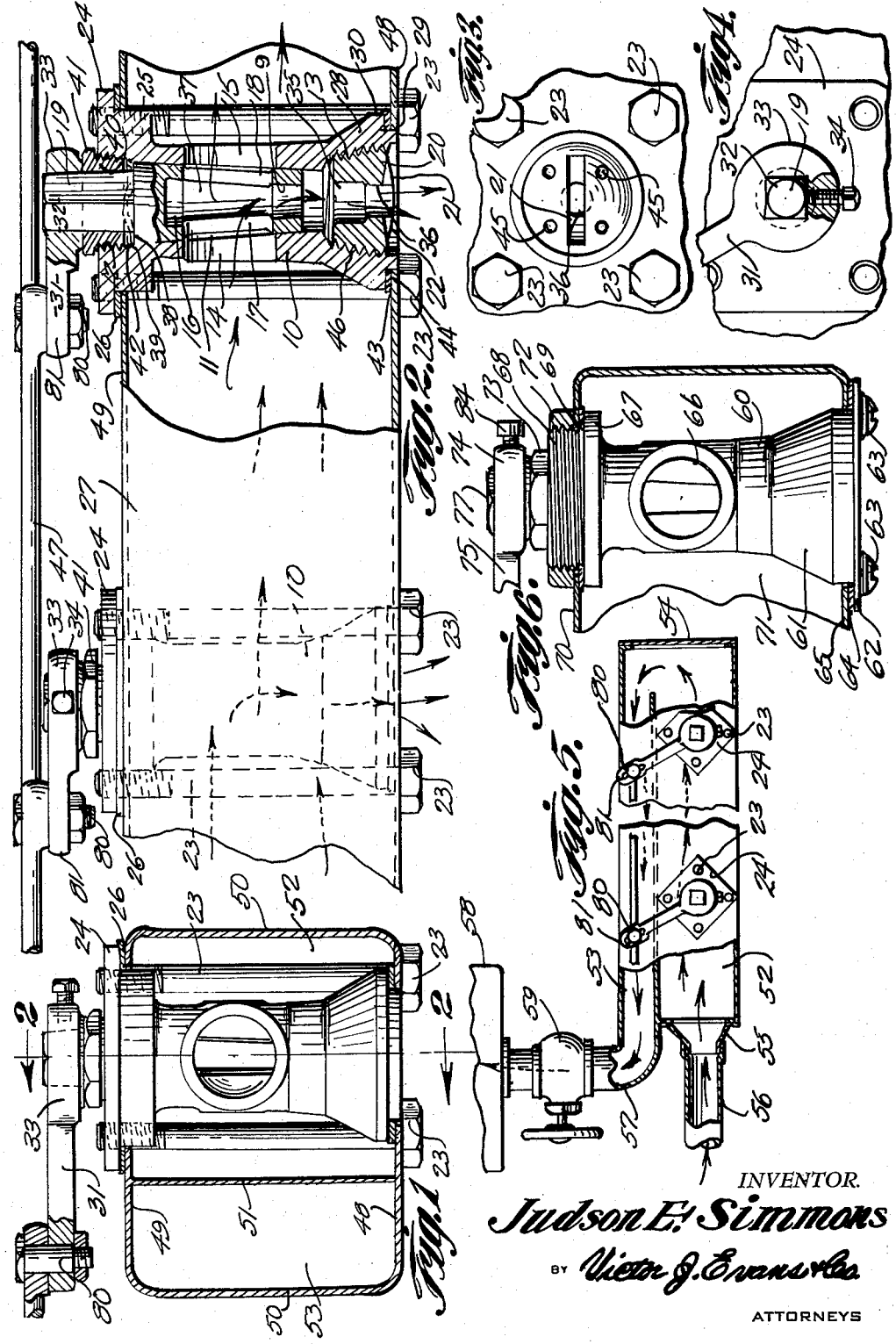

2,924,391

ASPHALT SPRAY BAR

Judson E. Simmons, Ardmore, Okla.

Application February 15, 1957, Serial No. 640,441

1 Claim. (Cl. 239—125)

The invention relates to road surfacing equipment and machinery, and particularly spray bars wherein asphalt is sprayed from a plurality of nozzles upon a roadway, and in particular a combination valve and spray nozzle for a spray header or bar in which hot asphalt is circulated through a supply channel of a spray bar, and, after passing around the outer end of a partition in the bar is returned through a return channel, and in which valves and spray nozzles are positioned within the limits of the supply channel whereby both the valves and nozzles are in direct contact with and surrounded by the hot asphalt.

The purpose of this invention is to provide a combination valve and spray nozzle whereby both the body of the valve and the spray nozzle are positioned inside of an asphalt supply portion of a spray bar so that not only the body of the valve but also the tip of the spray nozzle are subjected to the hot asphalt or other materials circulated through the bar thereby eliminating the possibility of the spray nozzle being clogged by cooling.

Various types of spray bars and valves have been used for spraying asphalt upon roadways and the like, however, although many devices of this type locate the valve within the bar, it has been found difficult, if not impossible, to draw the spray nozzle upwardly within the limit or above the lower surface of the bar or header whereby the nozzle is protected from cold winds, and the like.

With this thought in mind, this invention contemplates a spray bar having a plurality of valves with cylindrical bodies and tapered bores, spray heads threaded into sockets in the lower ends of the bodies whereby the spray heads are spaced upwardly from the lower surface of the bar and also lever actuated valve cores rotatably mounted in the bodies for controlling the discharge of asphalt and the like through the spray heads.

The object of this invention is, therefore, to provide a spray head for road surfacing material wherein the individual spray nozzles are positioned within the limits of the material carrying bar or header.

Another object of this invention is to provide a combination valve and spray head for spraying asphalt from a horizontally disposed bar in which the material sprayed through the individual heads is adjustable.

A further object of the invention is to provide an improved combination valve and spray head for asphalt spraying bars in which the device is of a simple and economical construction.

With these and other objects and advantages in view the invention embodies a cylindrical valve body having a tapering bore extended vertically through a supply section of a spray bar, with openings extended through opposite sides thereof and with the body also having internally threaded sockets in the upper and lower ends, a spray head having a relatively small opening extended therethrough threaded in the socket in the lower end of the valve body, and a tapering valve core having a square shank extended from the upper end rotatably mounted in the valve body and positioned to close the passages extended therethrough.

Other features and advantages of the invention will appear from the following description taken in connection with the drawing wherein:

Figure 1 is a cross section through a spray bar with one of the combination valves and spray devices shown in elevation therein.

Figure 2 is a side elevational view of the spray bar with parts broken away showing a longitudinal section taken on line 2—2 of Figure 1, illustrating the relative positions of the valve body, valve core, and the spray head.

Figure 3 is a fragmentary detailed view looking upwardly toward the lower end of the valve body shown in Figure 2.

Figure 4 is a plan fragmentary detailed view showing a control lever extended from the upper end of a square shank on the upper end of the core of the valve.

Figure 5 is a plan view on a reduced scale showing a typical spray bar with parts broken away showing the supply and return channels with the return channel extended to a reservoir or tank and having a control valve therein.

Figure 6 is a cross section through the spray bar, similar to that shown in Figure 1, illustrating a modification wherein the mounting elements of the valve body are reversed, with the flange on the lower end and the threaded nipple and lock nut on the upper end.

Referring now to the drawing wherein like reference characters denote corresponding parts the improved spray valve of this invention includes a valve body 10 having a tapering bore 11 with an internally threaded counterbore providing a socket 12 in the upper end and a similar counter-bore providing a socket 13 in the lower end and said valve body being provided with openings 14 and 15, a tapering core 16 having laterally disposed openings 17 and 18 therethrough and an opening 9 through the lower end is positioned in the bore 11 and has a shank 19 with flat sides extended from the upper end, a plug providing a spray nozzle 20 threaded in the socket 13 in the lower end, and having a spray forming groove 21 with an arcuate base 22 in the arcuate end surface, bolts 23 extended from the base through the spray bar and threaded in threaded openings in a flange 24 extended from a shoulder 25 at the upper end of the valve body, a sealing gasket 26 positioned around the shoulder 25 and between the flange 24 and upper surface of the upper panel or top of the spray bar 27, the valve body being provided with an enlarged lower end 28 having a rim 29 extended from a shoulder 30 and positioned with the lower edge of the rim flush with the lower surface of the spray bar, and an arm 31 having a square socket 32 in a hub 33 secured in position on the shank 19 of the valve core by a set screw 34.

The spray nozzle 20 is provided with an inner opening 35 that provides communicating means between a spray forming slot 36 extended through the lower portion of the spray head and the interior of the valve body. The valve core 16 is provided with an inner tapering bore 37 and with the parts in the position illustrated in Figure 2, asphalt is free to flow through the openings 14 and 15 of the valve body and the openings 17 and 18 of the core 16 wherein the asphalt passes downwardly through openings 9 and 35 and slot 36 of the spray head and is sprayed downwardly through the lower end of the valve body.

By this means the complete spray head 20 is positioned above the inner surface of the bottom of the spray bar so that both the valve body and spray head are within the hot asphalt passing through the supply section of the spray bar.

The upper end of the valve core 16 is provided with a shoulder 38 that is in registering relation with a shoulder 39 in the valve body 10 and the threaded portion 40 of a packing gland or nut 41 threaded in the socket 12 in the upper end of the valve body clamps a gasket 42 against the shoulders 38 and 39.

A similar gasket 43 is positioned between the shoulder 30 on the lower end of the valve body and the inner surface 44 of the base of the spray bar.

The end surface of the nozzle 20 is provided with notches 45 to facilitate turning the nozzle in the pipe threads 46 to adjust the positions thereof.

The arm 31 on the upper end of the shank 19 of the valve core is connected to a longitudinally disposed bar 47 with bolts whereby all of the valves in the spray bar may be opened and closed with the same movement and may be adjusted to the same angular position.

As shown in Figure 1, the spray bar is provided with a base or bottom 48, an upper panel or top 49, side panels 50 and a partition 51 which divides the spray bar into a supply section or compartment 52 and a return compartment 53. The bar is also provided with an end wall 54, a conical-shaped nipple 55 and a supply connection 56. The return compartment is provided with a connection 57 that extends to a storage tank 58 and the connection 57 is provided with a valve 59.

In the design illustrated in Figure 6, the position of the valve body is in reverse whereby a valve body 60 is provided with an enlarged lower end 61 from which a flange 62 extends and screws 63 extended through the flange 62 and a gasket 64 are threaded into the bottom 65, similar to the bottom of the spray bar shown in Figure 2. The enlarged lower end 61 of the valve body is provided with a spray nozzle 20 similar to the spray head or nozzle shown in Figure 2 and the spray nozzle is threaded into a socket, similar to the socket 13. The valve body is also provided with openings 66 similar to the openings 14 and 15 of the valve body 10 and the upper end is provided with shoulder 67, similar to the shoulder 25 and, in this design, a threaded nipple 68, extends through an opening 69 in the top panel 70 of the spray bar 71. The nipple 68 is provided with a lock nut 72, a packing nut 73 and a hub 74 of an arm 75, similar to the arm 31 of the design shown in Figure 2. The hub 74 is also provided with a set screw 84 by which the hub is secured on a shank 77 of the valve core, similar to the shank 19 of the core shown in Figure 2.

Although it will be appreciated that the improved valve and spray head may be used in headers or spray bars of different types of design, the combination valve and spray head of this invention is shown positioned in a bar or header 27 having an open supply channel 52 in the leading side and a return channel 53 in the opposite side, and as shown in Figures 1 and 5 the valve body and spray nozzle are positioned in the channel 52 where the parts are subjected to relatively hot asphalt or oil flowing through the header or bar.

The valve cores 16 are turned to open, closed, or intermediate positions of the valve by a rod 47 which is connected by pins 80 to the arms 31 on the shanks 19 of the cores 16 with hubs 33 of the arms secured in position upon the square shanks 19 with set screws 34. The pins 80 extend through elongated slots 81 to provide freedom of movement in actuating the pins 80 through an angle of ninety degrees in relation to the openings of the valves.

The hot asphalt is supplied to the header under pressure through the tube 54 that is connected to the conical-shaped neck 55 and the unused material forced through the header is returned to the tank 58 through the control valve 59. The control valve 59 makes it possible to regulate the pressure of material in the header and by this means the amount of material sprayed through the nozzles may also be controlled.

The flange 24 is illustrated as being square, however, the flange may also be positioned with the sides at an angle of 45° wherein the flange would be diamond-shaped as shown in Figure 5.

It will be understood that modifications within the scope of the appended claim, may be made in the design and arrangement of the parts without departing from the spirit of the invention.

What is claimed is:

For use in a mobile hot asphalt spraying device, a hollow spray bar adapted to be connected for circulation with a source of hot asphalt, a combination valve and spray nozzle in said spray bar, said valve having a control means extending through an upper portion of said spray bar and a nozzle extending through a lower portion of said spray bar, the terminal portion of said nozzle being located inwardly of the inner surface of said spray bar, whereby substantially all of said nozzle is surrounded by hot asphalt to keep the same from freezing in said nozzle.

References Cited in the file of this patent

UNITED STATES PATENTS

| 1,191,607 | Mills | July 18, 1916 |
| 2,657,092 | Jones | Oct. 27, 1953 |

FOREIGN PATENTS

| 368,416 | Great Britain | Mar. 10, 1932 |
| 383,418 | Great Britain | Nov. 17, 1932 |
| 701,780 | Great Britain | Dec. 30, 1943 |